United States Patent
Bergeron

[19]

[11] Patent Number: 6,158,093

[45] Date of Patent: Dec. 12, 2000

[54] LINE CONNECTOR MECHANISM AND METHOD OF USE THEREOF

[75] Inventor: Billy J. Bergeron, Arnaudville, La.

[73] Assignee: Delmar Systems, Inc., Broussard, La.

[21] Appl. No.: 09/073,900

[22] Filed: May 6, 1998

Related U.S. Application Data

[60] Provisional application No. 60/045,735, May 6, 1997.

[51] Int. Cl.⁷ .................................................... F16G 11/00
[52] U.S. Cl. ..................... 24/129 R; 24/122.6; 24/136 R
[58] Field of Search ................................ 24/129 R, 130, 24/131 C, 136 L, 136 R, 122.6, 265 AL, 265 EE; 403/211; 294/74

[56] References Cited

U.S. PATENT DOCUMENTS

| | | | |
|---|---|---|---|
| 636,641 | 11/1899 | Davin | 24/136 R |
| 802,537 | 10/1905 | Uren | 24/122.6 X |
| 917,738 | 4/1909 | Opsal | 24/129 R X |
| 1,537,785 | 5/1925 | Parker | 24/129 R X |
| 4,333,675 | 6/1982 | Wirkkala | 24/122.6 X |
| 4,782,560 | 11/1988 | Keller | 24/136 L |
| 5,525,003 | 6/1996 | Williams et al. | 24/136 R |

*Primary Examiner*—Robert J. Sandy
*Attorney, Agent, or Firm*—James L. Jackson; Mayor, Day, Caldwell & Keeton, L.L.P.

[57] ABSTRACT

A wire socket connector having an open throated basket type body that incorporates a load supporting connection at the upper portion thereof for connection with a lifting device in the form of a chain, wire line, lifting hook or the like. The body defines a tapered internal socket receptacle for receiving a tapered wire socket that is affixed to a wire line to which force, such as a lifting force, is to be applied. The body also defines a laterally opening slot through which the socket bearing wire line moves to gain registering access with the socket receptacle and is structured to permit relatively linear movement of the wire socket into the socket receptacle as a wire line connection is being made or when the wire line is being released from the wire socket connector. The connector body defines an internal reverse tapered shoulder for mating configuration with the load transmitting end of the wire socket of the wire line so that load responsive resultant forces are directed radially inwardly rather than radially outwardly.

14 Claims, 3 Drawing Sheets

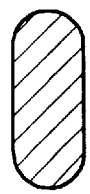
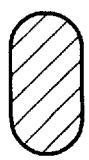
FIG.3A  FIG.3B  FIG.3C
FIG.3D  FIG.3E  FIG.3F
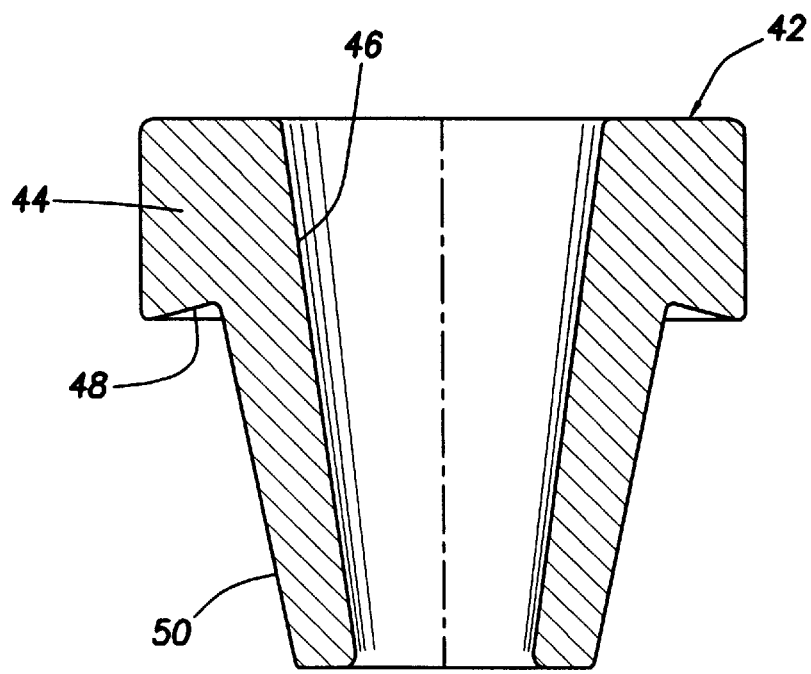
FIG.4

LINE CONNECTOR MECHANISM AND METHOD OF USE THEREOF

The benefit of United States Provisional Application Serial No. 60/045,735 filed on May 6, 1997 by Billy J. Bergeron and entitled Method And Apparatus For Suction Anchor And Mooring Deployment And Connection, is hereby claimed.

BACKGROUND OF THE INVENTION

1. Field of the Invention

This invention relates generally to connecting devices for connecting wire line, also called wire rope, to other objects. More particularly, this invention concerns a wire socket connector mechanism which facilitates remotely controlled connection and reconnection of wire lines to objects, including other wire lines, and enables users to make wire line connections and disconnections in remote or hostile environments without necessitating the presence of personnel at the site where wire line connections and disconnections must occur. Even more specifically, the present invention concerns an open throated, basket type wire line socket connector having enhanced load resisting characteristics due to the contoured design of load resisting components and which incorporates a socket and socket receptacle configuration that minimizes the potential for spreading or splitting of the connector body structure thereof when loads of high magnitude are applied thereto.

2. Description of the Prior Art

When a wire line or wire rope is connected to an object, connected to another length of wire rope or connected to a load carrying chain a connector device of some sort is required. Typically a wire line connector, especially a connector that is releasable, requires an interlocking connector mechanism having a latch to prevent inadvertent separation of the connector components. Simple but efficient wire line connectors are often provided with removable connector pins or bolts which are used to secure connector components in assembly and yet provide for ease of connector release or separation when it becomes desirable to release a wire line from an object. One representative example of a wire line connector is set forth in U.S. Pat. No. 4,642,854 of Kelly et al, which is a wire socket connector having a body structure and utilizing a cadmium or polymer material to permanently couple a wire line to the connector body. A releasable wire line connector which incorporates a connector bolt for connecting and releasing the connector mechanism is shown in FIG. 10 of U.S. Pat. No. 4,067,282 of Guinn et al.

In situations where a wire line connector of an object is remotely located, such as being located within a vertical shaft or in a subsea environment for example, it is desirable to provide a wire line connector mechanism having the capability for both assembly and disassembly by controlled movement of one or more connector components to thus ensure that connection and release of a wire line connector can be made without the need for personnel to be present at the connection site. When wire line connection and release activities are desired for use in inaccessible locations it is desirable that a releasable or quick release type wire line connector be provided having a simple and unique design that permits connection and release to be accomplished simply by movement of the wire line or the object to which the wire line is connected. The wire line connector must also be of a character that a remotely controlled device such as a robot or remotely operated vehicle of appropriate type can achieve the simple movement of a wire line relative to a wire line connector such that connection and release can be easily accomplished even under adverse conditions.

SUMMARY OF THE INVENTION

It is a principal feature of the present invention to provide a novel wire socket connector mechanism having the capability for simple and efficient connection and release of a wire line from an object which may be a fixed or movable object or may be another section of wire line;

It is another feature of the present invention to provide a novel wire socket connector mechanism which is of contoured design in regions of load bearing contact thereof to thus enhance the load carrying or resisting capability of the connector;

It is an even further feature of the present invention to provide a novel wire socket connector mechanism which incorporates a wire socket structure and a connector body structure that are designed to direct resultant forces radially inwardly rather than radially outwardly to thus minimize the potential for the connector body to spread or split under application of high magnitude load force thereto;

It is also a feature of the present invention to provide a novel wire socket connector and method for using the same which enables connection and disconnection of wire lines and other such force transmitting and restraining devices without any requirement for mechanical devices or tools;

It is another feature of the present invention to provide a novel wire socket connector and method for using the same which enables connection and disconnection of wire lines and other such force transmitting and restraining devices by means of controlled movement of connector components thereof; and It is an even further feature of the present invention to provide a novel wire socket connector and method for using the same which enables connection and disconnection of wire lines and other such force transmitting and restraining devices by means of robots, remote operating vehicles and the like when the wire socket connector is inaccessible by personnel.

Briefly, the various objects and features of the present invention are realized by providing a wire socket connector having an open throated basket type body structure that incorporates a load supporting connection at the upper portion thereof for connection with a lifting device in the form of a chain, wire line, lifting hook or the like. The body structure defines an internal socket receptacle for receiving a tapered wire socket that is affixed to a wire line to which force, such as a lifting force, is to be applied. The body structure also defines a laterally opening slot through which the socket bearing wire line moves to gain registering access with the socket receptacle and is structured to permit relatively linear movement of the wire socket into the socket receptacle as a wire line connection is being made and as the wire line is being released from the wire socket connector.

The connector body is of a reverse tapered internal configuration and is of a mating configuration with the load transmitting end of the wire socket of the wire line so that load responsive resultant forces are directed radially inwardly rather than radially outwardly. This feature minimizes the potential for load responsive spreading or splitting of the open throated connector body and consequently enhances the load carrying or resisting capability of the connector body.

A force transmitting member, which may be a wire line, a post, connector link or the like is provided with a tapered socket member and is positioned by any suitable means so as to be ready for seating engagement within a socket receptacle of a socket connector device which represents the second connector component of the socket connector mechanism. With the force transmitting member and tapered socket so positioned, the socket connector is moved in controlled manner to bring the tapered socket member in registry with the entry opening that is defined by the socket connector. Thereafter, the socket connector is moved relative to the tapered socket member to cause entry and seating of the socket member within an internal socket receptacle of the socket connector. With the socket seated within the socket receptacle, force applied through the socket connector will be transmitted through the socket to the force transmitting member. As long as this force is applied the socket connection will remain connected. Release of the socket connection is achieved simply by reversing the force application so that the tapered socket member is moved from the socket receptacle through the entry opening of the socket connector. The socket connector defines an entry slot to allow the force transmitting member, which may be a wire line, connector link or the like to move through the entry slot and to or from registry with the socket receptacle during connection and disconnection procedures.

Other and further features of the present invention will become obvious upon an understanding of the preferred embodiment of the invention which is described in detail herein and the method by which the wire socket connector of this invention is utilized for wire line connection and release, for recovery of wire lines and for remotely controlled connection and release activities.

BRIEF DESCRIPTION OF THE DRAWINGS

The various objects and advantages of this invention will become apparent to those skilled in the art upon an understanding of the following detailed description of the invention, read in light of the accompanying drawings which are made a part of this specification and in which:

In the Drawings:

FIGS. 3A though 3F are sectional views taken along respective section lines A—A through 3F of FIG. 3 to thereby show the cross-sectional configuration of the connection bail at various locations along the lengths of the body support arms thereof;

FIG. 4 is a sectional view of a socket element adapted to be fixed to a wire by zinc or polymer connection and further adapted for seated assembly within the wire socket connector of FIGS. 1–3.

DETAILED DESCRIPTION OF PREFERRED EMBODIMENT

Figure 1:
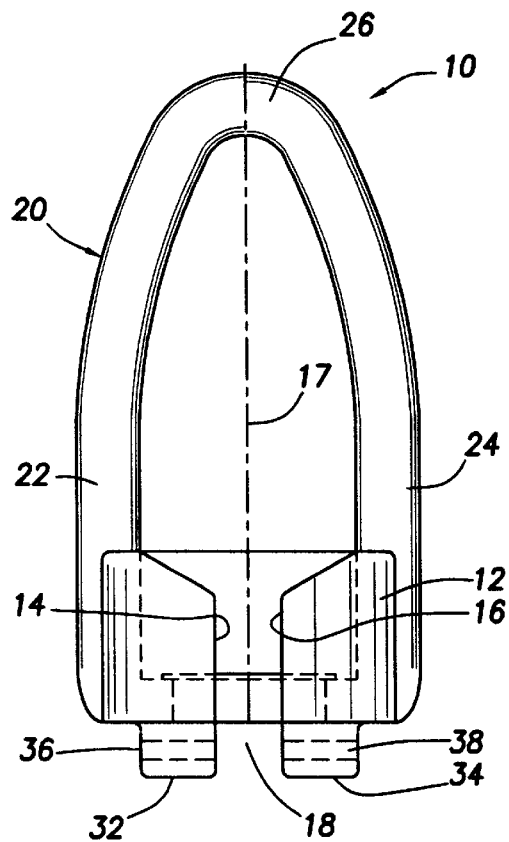
FIG. 1 is a front elevational view of a wire socket connector that is constructed in accordance with the principles of the present invention and represents the preferred embodiment of the invention and which is adapted to receive a socket, that is connected to an object, which may be another wire line section to thus permit quick and efficient connection and release of a wire line from the object.
Figure 2:
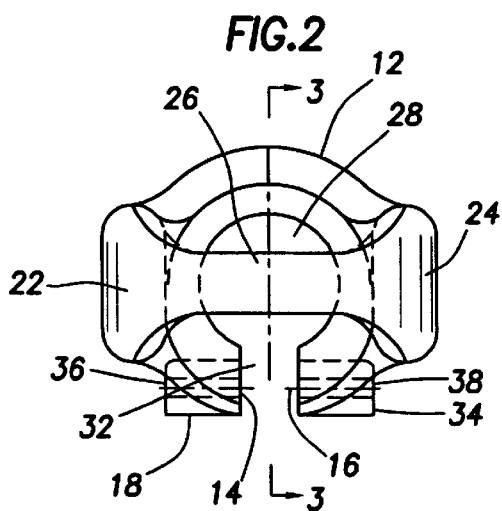
FIG. 2 is a plan view of the quick release type wire socket connector of FIG. 1.
Figure 3:
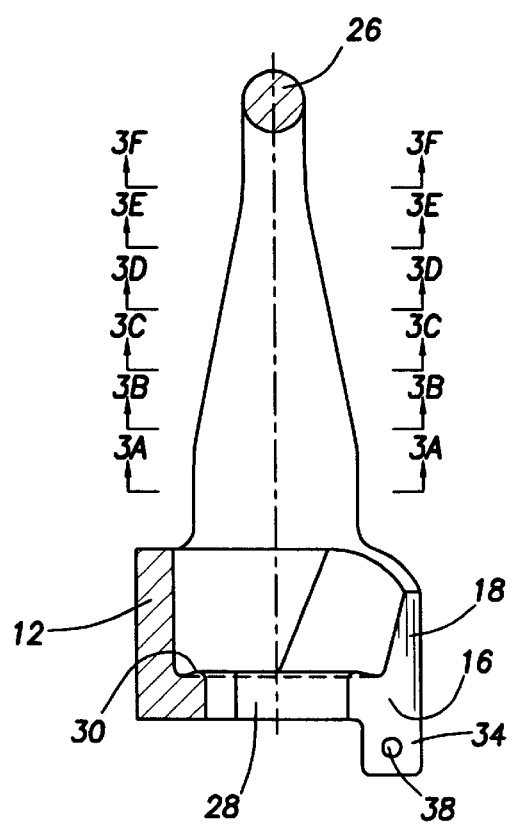
FIG. 3 is a sectional view taken along line 3—3 of FIG. 2 and showing the internal geometry of the socket connector as well as the geometry of the connecting eye thereof.

Referring now to FIGS. 1–5, a quick release, basket type wire socket connector is shown generally at 10 and incorporates a wire socket body structure 12 of generally circular cross-sectional configuration having spaced, generally parallel surfaces 14 and 16 which defined a wire access opening 18. The generally parallel surfaces 14 and 16 are disposed in generally parallel relation with the longitudinal axis 17. A bail structure, shown generally at 20, is formed integrally with the wire socket body structure 12 and defines upwardly extending body support arms 22 and 24 that are interconnected at the upper ends thereof by a curved bail section 26 of circular cross-sectional configuration as shown in FIG. 3. The cross-sectional geometry along the length of the connector body support arms 150 and 152 is indicated by sections 3A through 3F.

The connector body structure 12 defines a central socket receptacle opening 28 in communication with the wire access opening 18. About the central opening 28, the connector body also defines a reverse angled circular seat shoulder 30 which extends to the wire access opening 18. The conical, reverse angled seat shoulder 30 provides for seating of a wire socket within the connector body as will be discussed hereinbelow. The connector body structure also defines a pair of locking tabs 32 and 34 which project downwardly on each side of the wire access opening 18 as is best shown in FIGS. 1–3. These locking tabs define registering through bores 36 and 38 that can receive a bolt, pin or other suitable locking connector for securing a winch line or other force transmitting line, as the case may be, within the central socket receptacle opening 28 of the connector body. The bolt or locking pin may be extended through the registering through bores 36 and 38 by manual operation or by a robot or remote operating vehicle (ROV) in order to prevent inadvertent disassembly of the wire socket connection assembly in the event the wire line should become slack for any reason.

Figure 5:
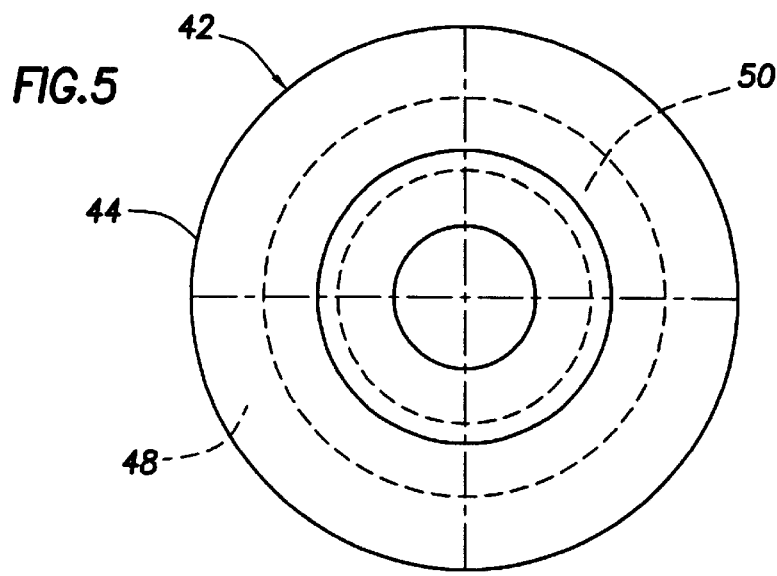
FIG. 5 is a bottom view of the wire socket element of FIG. 4.

As shown in FIGS. 4 and 5, a socket member shown generally at 42 is defined by a socket body 44 having a tapered central passage 46 through which a wireline or mooring line extends. The socket body is fixed to the wireline by zinc, cadmium, polymer or any other material that is poured into the through passage 46 in its molten or uncured liquid state and is then allowed to harden or cure to permanently fix the socket body to the wireline. The socket body also defines a circular conical shoulder 48 having the same angle as the reverse angled conical shoulder 30 of the socket body 12. After the wireline has passed through the wire access opening 18, and has located the socket body 44 above or in registry with the central opening 28 of the socket connector body, the wireline is lowered in relation to the connector body structure causing a tapered external guide surface 50 of the socket body to guide the socket into the socket receptacle opening 28, thus causing the conical shoulder 48 of the socket body to seat against the conical shoulder 30 of the connector body structure. The wire socket will become unseated from its supported relation within the wire socket receptacle opening 28 of the connector body simply by its upward movement relative to the connector body structure. After being unseated in this manner, assuming a locking member is not present with the registering openings 36 and 38, the wire and wire socket are moved laterally relative to the connector body structure thereby causing the wire to exit from the receptacle opening 28 via the wire access opening 18. It should be borne in mind that the wire socket connector shown in FIGS. 1–5 may be of other convenient configuration if desired, it being appropriate only that it have the capability of being quickly assembled and disassembled particularly in a remote environment such as the subsea environment and perhaps with the use of an ROV or other actuating mechanism for controlling relative movement of the connector body and wire socket structures for accomplishing quick connection or disconnection thereof.

When force is applied by urging the socket connector relative to the wire socket, which occurs as lifting force is applied to the socket connector of FIGS. 1–3, the mating tapered, reverse angled shoulder surfaces 30 and 48 develop a resultant force which is directed radially inwardly rather than radially outwardly as is typical. When conventional tapered wire socket connectors are employed application of seating force of the wire socket within the connector body places the body structure under hoop stress. When these hoop stress forces are if high magnitude the connector body structure can be yielded and at times can become split. The inwardly directed resultant force developed by the mating reverse angled shoulder surfaces 30 and 48 under load, minimizes the potential for hoop stress induced yielding or splitting of the socket connector body and thus enhances the load carrying characteristics of the wire socket connector mechanism of the present invention.

Figure 6:
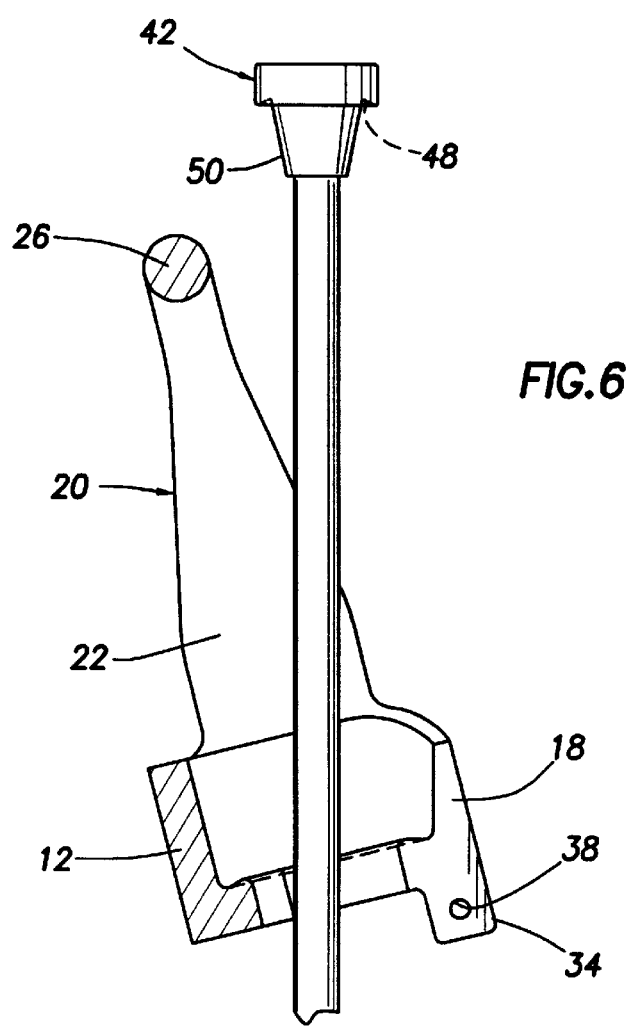
FIG. 6 is a partial sectional view showing a wire socket fixed to a wire line and showing a basket type socket connector device being constructed in accordance with the principles of the present invention and being separate from the wire socket and in position for movement upwardly along the wire line to position the wire socket in seated relation within the socket receptacle of the connector device.

With reference to FIG. 6 a wire socket connector assembly is shown with the wire socket thereof fixed to a wire line by means of zinc, cadmium, polymer or by any other suitable means and with the wire socket connector being separated from the wire socket and being manipulated by a connector handling line and being movable along the wire line to a position receiving the wire socket in seated relation within the socket receptacle of the wire socket connector to thus establish connection of the wire socket line to the connector line. Although the wire socket connector is shown to be movable upwardly to receive and seat the wire socket within the internal receptacle of the wire socket connector, it should be borne in mind that this manner of connection is not intended to restrict the spirit and scope of the present invention. If desired, the wire socket may be oriented horizontally or at any angle between horizontal and vertical, it only being necessary that the socket connector be capable of being moved along the length of the wire line until the socket member has come into contact with the socket connector and has entered and become seated within the internal socket receptacle of the socket connector. After the socket member has become seated within the internal socket receptacle of the socket connector, it will remain so seated as long as force being applied to the wire line segments is in a direction forcing the wire socket into the socket receptacle. The socket member will easily become unseated from the socket receptacle when the wire line forces are reversed. This arrangement permits the wire socket connecting system to be controllably connected and disconnected simply by directionally controlled movement of the wire line. Additionally, robots and ROV's may be used in circumstances where the connection mechanism is not readily accessible.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims of an issued patent based hereon rather than the foregoing description, and all changes which come within the meaning and range of equivalence of such claims are therefore intended to be embraced therein.

I claim:

1. A socket connector mechanism for connecting and disconnecting lines, comprising:
    (a) a socket connector body defining an internal socket receptacle and defining spaced connector body surfaces defining a laterally opening line access slot;
    (b) a bail being integral with said socket connector body and having a pair of support arms being interconnected at the upper ends thereof, said bail being oriented with respect to said socket connector body such that when said socket connector body is supported by said bail said line access slot being oriented for lateral ingress and egress of a line to and from said internal socket receptacle; and
    (c) a generally annular reverse tapered force transmitting seat shoulder being defined by said socket connector body within said socket receptacle;
    (d) a socket being fixed to a line and having a corresponding reverse angled generally annular force transmitting tapered seat surface for mating seating engagement with said generally annular reverse tapered force transmitting seat shoulder within said internal socket receptacle.

2. The socket connector mechanism of claim 1, comprising:
    said socket connector body defining a pair of spaced, generally parallel surfaces defining said laterally opening line access slot.

3. The socket connector mechanism of claim 1, wherein:
    with said socket being in seated engagement with said generally annular reverse tapered force transmitting shoulder and with said line of said socket being located within said internal socket receptacle, application of opposing forces to said bail and said line developing an inwardly directed resultant force to said reverse angled seat shoulder to prevent force induced spreading of said socket connector body.

4. The socket connector mechanism of claim 1, comprising:
    said socket having a conical undercut surface defining said corresponding reverse angled generally annular force transmitting shoulder.

5. The socket connector mechanism of claim 1, comprising:
    (a) said socket having a conical undercut surface defining said corresponding reverse angled generally annular force transmitting shoulder; and
    (b) said line extending through said socket and being located generally centrally of said conical undercut surface.

6. The socket connector mechanism of claim 1, said bail comprising:
    (a) a pair of body support arms projecting from said socket connector body and having a curved bail section being integral with said body support arms; and
    (b) said body support arms having graduated thickness, being of greater thickness at said socket connector body and of less thickness at said curved bail section.

7. A socket connector mechanism for connecting and disconnecting lines, comprising:
  (a) a socket connector body defining an internal socket receptacle and having spaced connector body surfaces defining a laterally opening line access slot;
  (b) a bail being integral with said socket connector body and having a pair of support arms being interconnected at the upper ends thereof said bail being oriented with respect to said socket connector body such that when said socket connector body is supported by said bail said line access slot being oriented for lateral ingress and egress of a line to and from said internal socket receptacle; and
  (c) a generally annular reverse tapered force transmitting seat shoulder being defined by said socket connector body within said socket receptacle and being intersected by said laterally opening line access slot;
  (d) a socket being fixed to a line and having a corresponding reverse angled generally annular force transmitting tapered socket shoulder being located substantially concentrically about the line for mating seating engagement with said generally annular reverse tapered force transmitting shoulder within said internal socket receptacle.

8. The socket connector mechanism of claim 7, comprising:
  (a) a pair of body support arms projecting from said socket connector body and having a curved bail section being integral with said body support arms; and
  (b) said body support arms having graduated thickness, being of greater thickness at said socket connector body and of less thickness at said curved bail section.

9. The socket connector mechanism of claim 7, comprising:
  with said socket being in seated engagement with said generally annular reverse tapered force transmitting shoulder and with said line of said socket being located within said internal socket receptacle, application of opposing forces to said bail and said line developing an inwardly directed resultant force to said reverse angled seat shoulder to prevent force induced spreading of said socket connector body.

10. The socket connector mechanism of claim 7, comprising:
  said socket having a conical undercut surface defining said corresponding reverse angled generally annular force transmitting shoulder.

11. The socket connector mechanism of claim 7, comprising:
  (a) said socket having a conical undercut surface defining said corresponding reverse angled generally annular force transmitting shoulder; and
  (b) said line extending through said socket and being located generally centrally of said conical undercut surface.

12. A method of connecting and disconnecting a line, comprising:
  (a) supporting a socket connector body defining an internal socket receptacle and having a laterally opening line access slot through said socket connector body to said internal socket receptacle and having a longitudinal axis located centrally of said internal socket receptacle such that said said line access slot is oriented for ingress and egress of a line; and
  (b) for line connection, causing relative movement of said wire socket connector body and said line so that the line moves through said line access slot and into said wire socket receptacle and for wire line disconnection causing relative movement of said socket connector body and the line such that the line moves from said wire socket receptacle through said wire line access slot.

13. The method of claim 12, comprising:
  connecting and disconnecting the line by moving the line relative to said socket connector body.

14. The method of claim 12, comprising:
  connecting and disconnecting the line by moving said connector body relative to the line.

* * * * *